United States Patent
Siemer et al.

(10) Patent No.: US 7,338,037 B2
(45) Date of Patent: Mar. 4, 2008

(54) RUBBER BEARING WITH PATH DELIMITERS

(75) Inventors: Hubert Siemer, Dinklage (DE); Frank Duisen, Damme (DE); Frank Tepe, Hörstel (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 251 days.

(21) Appl. No.: 11/181,382

(22) Filed: Jul. 14, 2005

(65) Prior Publication Data

US 2006/0012093 A1  Jan. 19, 2006

(30) Foreign Application Priority Data

Jul. 16, 2004  (DE) ...................... 10 2004 034 578

(51) Int. Cl.
*F16M 9/00*  (2006.01)

(52) U.S. Cl. ..................... 267/140.2; 267/218; 267/293

(58) Field of Classification Search ................ 267/141, 267/141.1, 141.2, 217, 218, 219, 292, 293, 267/294, 140.13, 140.14, 140.15, 140.2; 280/5.523, 5.524, 5.522; 247/575, 576, 577, 247/578

See application file for complete search history.

(56) References Cited

U.S. PATENT DOCUMENTS 4,842,258 A * 6/1989 Misaka et al. ......... 267/140.13
5,110,097 A * 5/1992 Simon ...................... 267/141.1
5,228,663 A * 7/1993 Adler et al. ............ 267/140.14
7,011,187 B2 * 3/2006 Steinbeck .................... 267/141
2006/0012092 A1 * 1/2006 Siemer et al. ........... 267/141.2

FOREIGN PATENT DOCUMENTS

| DE | 3925241 A1 * | 1/1991 |
| JP | 63120937 A * | 5/1988 |
| JP | 05215175 A * | 8/1993 |

* cited by examiner

*Primary Examiner*—Thomas Williams
(74) *Attorney, Agent, or Firm*—Norris McLaughlin & Marcus, PA

(57) ABSTRACT

A rubber bearing with a bearing body implemented as an elastomer spring, wherein the spring travel of the bearing body is limited in at least one damping direction by path delimiters. The path delimiter(s) are formed by at least two corresponding stop elements, whereby the spring travel of the elastomer bearing body in the respective direction is determined by the spacing or gap between the stop faces of the stop elements which form the path delimiter. The rubber bearing is constructed so that it can adapt to changing preloads. The path delimiter is designed so that the position of one of its stop elements can be changed, the spacing between the stop face of this stop element and that of the corresponding stop element can be changed, and the new position of the corresponding stop element can be fixed again. The position of the stop element is changed by an actuator arranged on the bearing or by temporarily loosening a locking means and passively tracking the position of the stop element according to the preload.

8 Claims, 3 Drawing Sheets

RUBBER BEARING WITH PATH DELIMITERS

BACKGROUND OF THE INVENTION

1. Field of the Invention

The invention is directed to a rubber bearing with a bearing body implemented as an elastomer spring, wherein the spring travel of the bearing body is limited in at least one damping direction by path delimiters. According to one embodiment, the invention is particularly directed to an elastomer bush bearing with axial limit stops.

2. Description of the Related Art

It is known to equip bush bearings in automobiles, which are used, for example, for supporting the connecting rod of chassis suspensions, with limit stops or path delimiters to limit the compression spring travel of the bearing body subjected to oscillations. This prevents destruction of the bearing due to excessive deformations or excessive elongation of the elastomer bearing body. The limit stops, in particular in bearings with a soft spring characteristic, are typically designed so that the produced excursion limit is not abrupt, but starts out rather gradually. This is achieved by forming the stop faces at least partially of an elastomer. This also prevents annoying vibration effects and noise when the excursion limitation takes effect.

An operating range is defined for the bearing within the characteristic curve field describing the spring characteristics by specifying the possible spring excursion of the elastomer bearing body until the excursion limitation takes effect. In conventional devices, the stop elements of the path delimiter are arranged on or in the bearing at a fixed location. If the preload acting on the bearing undergoes a change, for example when the vehicle load increases, then the operating range of the bearing disadvantageously shifts within the bearing damping curve towards the progressive branch of the spring characteristic. Stated differently, the free travel of the elastomer bearing spring is reduced on the spring compression side, while the free travel is simultaneously increased on the spring rebound or expansion side. When the preload changes, the bearing does then no longer operate in a symmetric operating range, with reference to the defined total spring travel of the elastomer spring, because the limit stop of the spring body is reached sooner in the spring compression direction than in the opposite direction. This causes a noticeable deterioration in the drive dynamics and the comfort of the vehicle.

SUMMARY OF THE INVENTION

It is therefore an object of the invention to construct a rubber bearing with a damping characteristic that can be adapted to changing preloads.

The object is solved by a rubber bearing with the features of the independent claim. Advantageous embodiments and modifications of the rubber bearing of the invention are recited in the dependent claims. A person skilled in the art will appreciate that the proposed solution is directed in general to a bearing with an elastomer bearing body, whereby the elastomer need not necessarily be rubber. The term rubber bearing is therefore used merely to provide a short description and by taking into consideration that the elastomer in most cases is at least rubber. However, this is not a limitation, so that other elastomer materials can be used within the context of the present invention.

The invention is based on a rubber bearing with a bearing body formed as an elastomer spring, which dampens the oscillations introduced into the bearing in an axial and/or radial direction. The rubber bearing is also provided with limit stop elements, forming one or several path delimiters, which limit the spring travel of the elastomer bearing body, or of the spring body, in one damping direction. The free travel of the elastomer spring is thereby defined by the spacing or gap between the stop faces of the limit stop elements which form the path delimiter in the respective direction. The position of one of the stop elements is fixed on or in the bearing, whereas the position of a corresponding stop element is only fixed relative to the elastomer spring and can therefore move with the spring during spring compression of the bearing body.

It is therefore an object of the invention to adapt the limitation of the spring travel in at least one damping direction in the rubber bearing of the invention to the preload applied in this direction during the operation of the bearing. The respective path delimiter is designed so that the position fix of one of the stop elements can be released, the gap of the stop face of this stop element relative to the corresponding stop element can be changed, and the position of the respective stop elements can be fixed again in the new position. The position of the stop element is changed according to the invention by way of an actuator arranged on the bearing or by temporarily loosening a locking means and tracking the position of the stop element according to the preload. The first approach, i.e. the controlled movement of the stop elements by a suitable actuator, actively adapts the position of the stop elements to the existing preload. With the latter approach, the respective stop element is merely unconstrained and is "entrained" by striking a complementary stop element, until reaching a predetermined nominal position value commensurate with the change in the preload, whereafter the position of the stop element is fixed again. At least one path delimiter of the rubber bearing of the invention is preferably designed so that the travel limitation is not abrupt. For this reason, at least one of the stop elements forming the respective path delimiter includes a stop face made of an elastomer.

In an advantageous practical application, the invention is used in a rubber bearing which is formed as an elastomer bush bearing with axial limit stops. The bush bearing is constructed in a conventional manner from an inner section made of metal. The elastomer bearing body is arranged concentrically thereto, and an outer sleeve is provided for receiving the inner section with the bearing body. The aforementioned parts of the bearing are connected with each other through vulcanization. Stop elements are arranged on or in the bearing, or alternatively as an assembly connected with and arranged in parallel with the bearing. The stop elements form path delimiters for limiting the axial movement produced during spring compression of the bearing body. Depending on the intended application, the bush bearing can also be implemented as a hydraulic bearing, wherein the bearing body includes at least two chambers connected via a flow channel and adapted to receive a damping fluid.

As mentioned above, different approaches are feasible for arranging and designing the path delimiters or limit stops. For example, the stop elements and the actuator or the corresponding locking means which lock the position of the stop elements, may be implemented as an integral component of the bearing, or alternatively as an assembly arranged in parallel with the bearing. According to an embodiment of a bush bearing according to the invention with axial limit stops, stop elements are arranged on both axial bearing ends and concentric with the bearing axis. One stop element of each axial limit stop is formed as a metal stop disk, which is connected with the inner section, so that its position is fixed relative to the bearing. The corresponding other stop element is connected with the elastomer spring, i.e. the bearing body, so that its position is fixed relative to the spring. According to the invention, the position fix of the latter stop element can be temporarily released, so that the spacing of its stop face from the corresponding stop disk can be changed to adapt the spacing to the preload.

According to another embodiment of a bush bearing, the axial limit stops together with a suitable actuator or locking means are arranged as an assembly on one axial bearing end parallel to the bearing axis and outside the outer sleeve. First stop elements are arranged on both sides of a radially outwardly extending retaining element which is connected with a bearing body that protrudes from the bearing sleeve on this bearing end. One of the first stop elements disposed on the retaining element forms in cooperation with one of the legs of a U-shaped second stop element, which is oriented transversely to the bearing axis, one of the path delimiters. The assembly consisting of path delimiters and actuator or locking means is designed so that the axial position of the U-shaped stop element can be changed by temporarily freeing its position fix.

According to an advantageous embodiment of the rubber bearing of the invention, the actuator or the locking means, which have already been described above, are implemented by a hydraulic cylinder. When the bearing is to be actively adapted to a changing preload, the cylinder operates as an actuator, which is controlled in response to the change in the preload, by moving the stop element of a path delimiter intentionally, i.e., actively, to a predetermined position with the piston of the hydraulic cylinder, which is connected to the stop element. In another possible approach, for passively adapting to a changing preload, the hydraulic cylinder can be constructed to operate as a releasable locking means which, when released, does not actively move a corresponding stop element to another position, but temporarily releases the position fix of the stop element to allow the stop element to move to another position. The locking means is here implemented by a double-acting hydraulic cylinder with two chambers. The chambers are connected with each other by a flow channel, which can be opened and closed to connect the chambers for allowing or preventing hydraulic means to flow through the channel. A piston which is connected with a stop element via a piston rod is guided in the chambers. The channel connecting the chambers is opened to release the position fix of the stop element connected to the piston. When the piston rod applies pressure to the piston of the hydraulic cylinder, the piston can move inside the hydraulic cylinder by displacing the hydraulic means in one of the chambers of the cylinder and allow flow of the hydraulic means into the respective other chamber. A stop element connected with the piston via the piston rod can also move from its original position to another position by striking a corresponding stop element. Through this movement, the corresponding stop element passively tracks the changing preload. The position of the stop element is fixed again after reaching its intended position by closing the channel connecting the chambers of the hydraulic cylinder.

Advantageously, the hydraulic cylinder forms part of a control circuit, regardless if it operates as an actuator or as a locking means. Sensors of the control circuit measure the preload applied to the bearing and the spacing between the stop faces of the stop elements of the path delimiter, and a processing unit derives therefrom a controlled variable. A controller adapts the spring travel to the preload by activating the actuator or the locking means in the aforedescribed manner.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
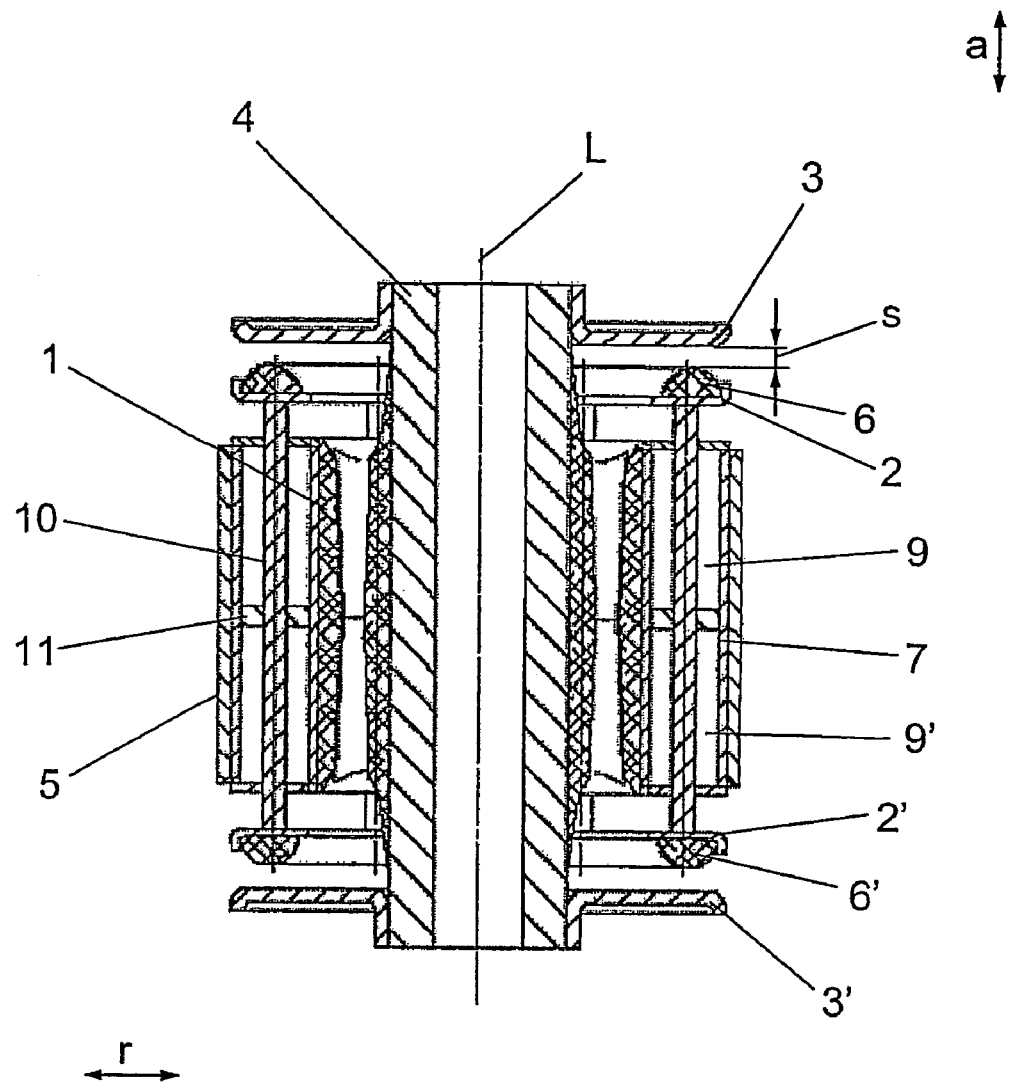
FIG. 1 a longitudinal cross-sectional view of an exemplary embodiment of a bush bearing according to the invention, FIG. 2 a longitudinal cross-sectional view of another embodiment of a bush bearing with stop elements arranged parallel to the longitudinal axis of the bearing, and FIG. 3 a three-dimensional view of the bearing of FIG. 2.

FIG. 1 shows an exemplary embodiment of a bush bearing according to the invention. The bearing includes in a conventional manner a metal inner section 4, an elastomer bearing body 1 concentrically enclosing the inner section 4, and an outer sleeve 5 which receives both the inner section 4 and the bearing body and is connected thereto through vulcanization. Axial limit stops are formed on both axial ends of the bearing as path delimiters for the axial spring travel of the bearing body 1, which operates like an elastomer spring. The path delimiters are each formed by two stop elements 2, 3 and 2', 3', respectively. One of the stop elements is connected to the bearing body 1 in a position that is fixed relative to the bearing body 1, whereas the other stop element is formed in and connected to the stop disk surrounding the inner section 4. The stop element 2, 2', which has an elastomer stop face 6, 6', is operatively connected to the elastomer bearing body 1 via the piston rod 10 of a hydraulic cylinder 7. The hydraulic cylinder 7 is enclosed between the bearing body 1 and the outer sleeve 5 and connected to the bearing body 1. The hydraulic cylinder 7, which surrounds the bearing body 1 in form of a ring, consists of two chambers 9, 9'. A piston 11, which is connected on both ends via a piston rod 10 with a corresponding one of the stop elements 2, 2' moves in the chambers 9, 9'. The axial position of the stop elements 2, 2' is fixed by the hydraulic means introduced in the chambers 9, 9'. If the bearing is adjusted so as to operate symmetrically with respect to the total spring travel defined by the separation s of the stop elements and if the preload is identical in the positive and negative axial direction a, then the piston 11 of the hydraulic cylinder 7 is located in a center position, as shown in the drawing. When the preload changes, a channel 12, which is not visible in the drawing (see, however, FIG. 2) can be opened to allow fluid flow between the two chambers 9, 9'. When the hydraulic means flows between the upper chamber 9 (as referenced to the drawing) into the lower chamber 9' and vice versa, the piston 11 can move in the hydraulic cylinder 7 in the positive or negative axial direction. The direction of the movement is determined by the change in the preload. A change in the preload, which can occur in a chassis bearing, for example, as the result of an increase in the vehicle load, causing a spring compression of the bearing body 1, would reduce the obtainable spring travel from oscillations at one axial side of the bearing, while simultaneously increasing the spring travel at the other side. If the channel 12 (not shown here) which connects the chambers 9, 9' of the hydraulic cylinder 7 is opened, then the piston can move together with the stop element 2, 2', which is connected to the piston 11 by the piston rod 10. The piston 11 moves in the opposite direction as the spring compression of the bearing body 1 caused by the changing preload. The spacing s between the stop elements 2, 2' connected with the bearing body 1 and the matching stop elements 3, 3', or the gap between the stop faces of the limit stop elements 2, 2', 3, 3', remains essentially unchanged after the position of the stop elements 2, '2 is fixed again by closing the channel 12, so that the bearing continues to operate in a symmetric operating range with respect to dynamic oscillations, as measured by the spring travel of its bearing body 1, even under a changed (static) preload. The opening operation of channel 12 (see FIG. 2) between the chambers 9, 9' is preferably controlled by a control circuit, which measures the axial preload and the spacing s or gap between the limit stop elements 2, 2', 3, '3 at both axial ends. The controlled variable determined by the controller controls if the channel 12 of the hydraulic cylinder 7, when operating as locking means, is released or blocked. When the fluid connection between the chambers 9, 9' of the hydraulic cylinder 7 is closed as the piston 11 reaches its intended position, the position defining the spacing s of the stop faces of the path delimiters is essentially frozen. In this way, the operating range of the rubber bearing is prevented from shifting in the positive or negative axial direction towards the progressive branch of the spring characteristic when the preload changes. Without fundamentally changing the embodiment depicted in FIG. 1, instead of a single ring-shaped hydraulic cylinder 7, several hydraulic cylinders can be arranged around the periphery to adjust the axial position of the stop elements 2, 2', which are then supported by the hydraulic cylinders.

Figure 2:
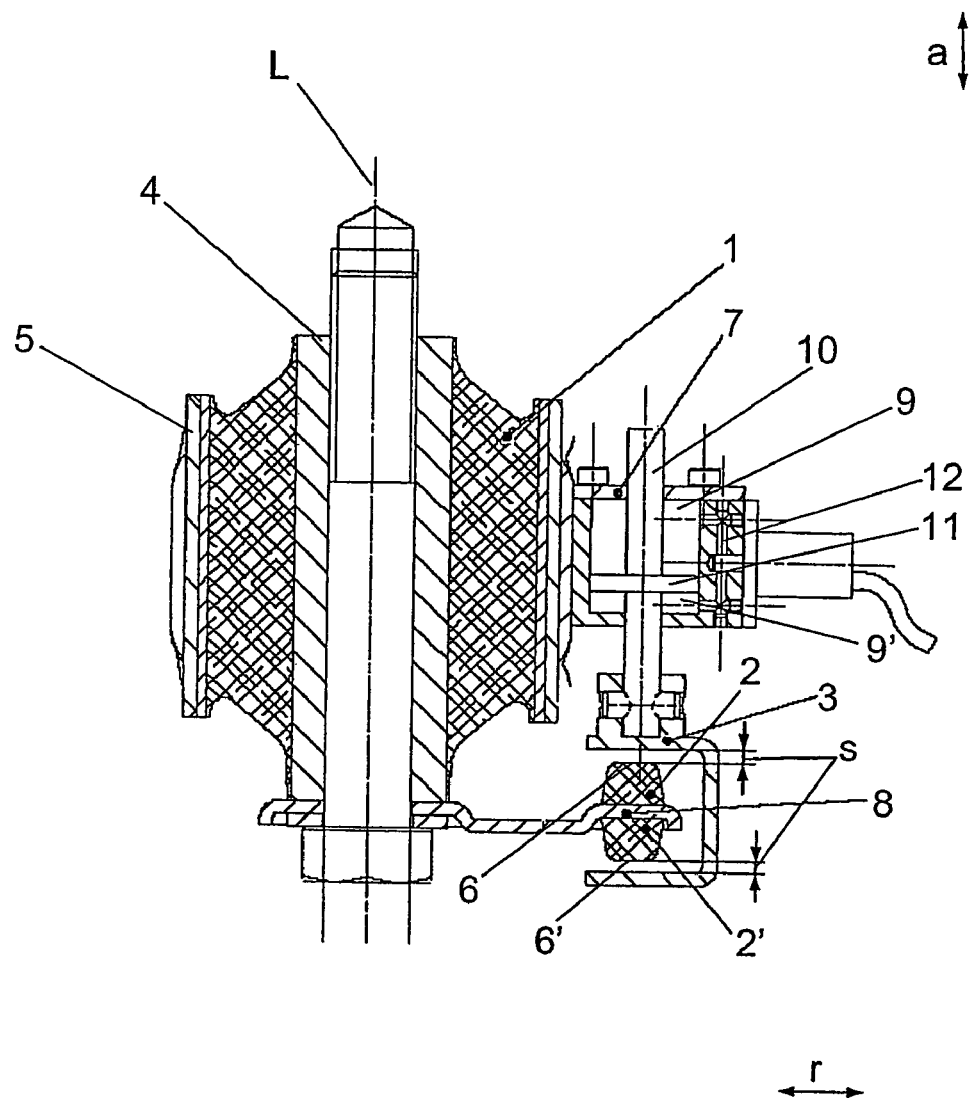

FIG. 2 shows another exemplary embodiment of a bush bearing according to the invention. Unlike in the embodiment of FIG. 1, the path delimiters and the hydraulic cylinder 7 are here arranged as an external assembly outside the bearing sleeve 5 in parallel with the bearing axis L. A radially outwardly extending fasting element 8 is arranged on the bearing body, which protrudes from the bearing sleeve 5 on one axial end of the bearing. A stop element 2, 2' is arranged proximate to the radial end of the fasting element 8 above and below the fasting element 8, referenced to the axial direction a. Each of the stop elements 2, 2' forms in cooperation with a corresponding additional U-shaped stop element 3 a path delimiter for the positive and negative axial direction. The U-shaped stop element 3 is connected via a piston rod 10 with the piston 11 of a hydraulic cylinder 7. As in the aforedescribed embodiment, the hydraulic cylinder 7 has two working chambers 9, 9' which are connected by a channel 12 for the hydraulic means, which is visible in FIG. 2. The operating principle of the bearing is otherwise identical to that of the embodiment depicted in FIG. 1. In other words, when the channel 12 is opened to release the position fix of the stop element 3, the stop element 3 is—depending on the preload—entrained by the matching stop element 2 or 2'. Its axial position is fixed again when the channel 12 is closed.

Figure 3:
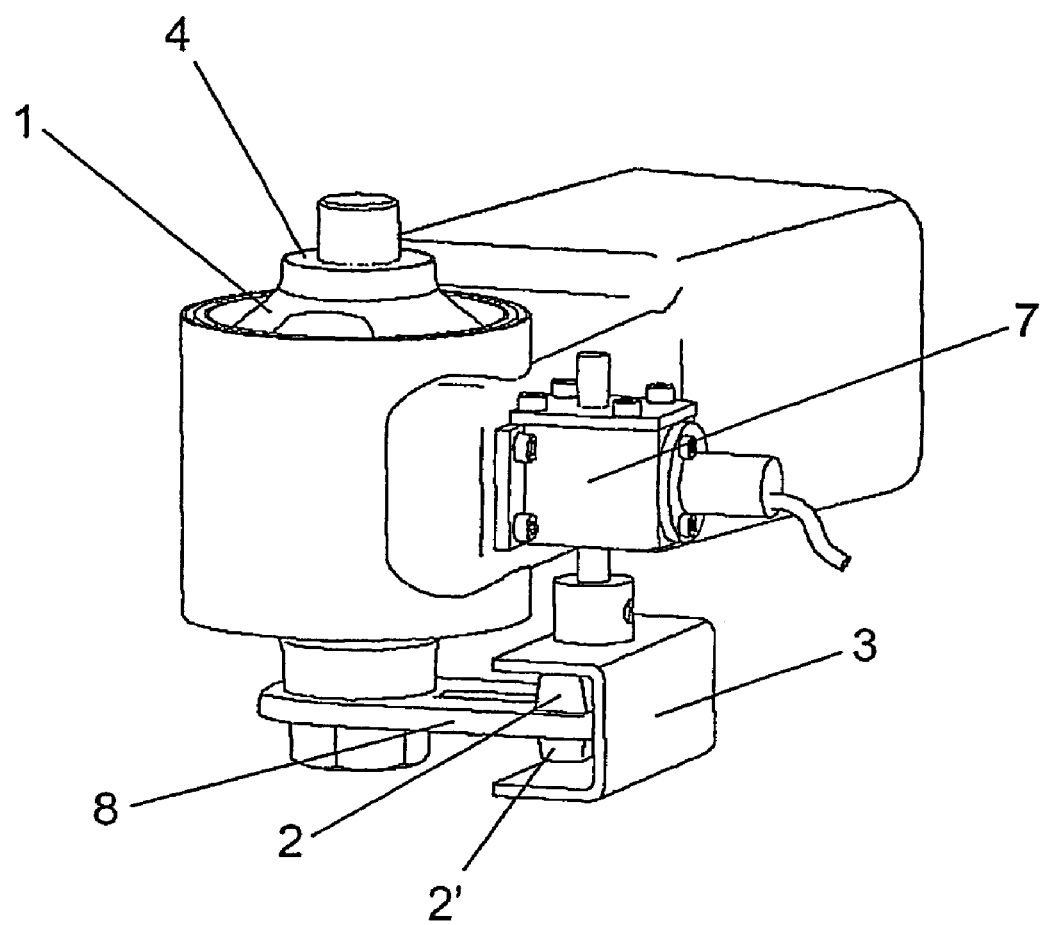

FIG. 3 shows a three-dimensional view of the bearing shown in FIG. 2 in a longitudinal cross-section. Clearly visible are the bearing with the inner section 4, the elastomer bearing body 1 and the outer sleeve 5 visible, as well as the parallel assembly, which form the position-changeable limit stops with the hydraulic cylinder 7 and the stop elements 2, 2', 3, 3'.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

LIST OF REFERENCE SYMBOLS
1 bearing body, elastomer spring
2, 2' stop element
3, 3' stop element
4 inner section
5 outer sleeve, bearing sleeve
6, 6' elastomer stop faces
7 locking means, hydraulic cylinder
8 fasting element
9, 9' (working) chambers
10 piston rod
11 piston
12 channel
a axial, or axial direction
r radial, or radial direction
s spacing or gap
L bearing axis

What is claimed is:
1. A rubber bearing comprising
a bearing body implemented as an elastomer spring for damping oscillations introduced into the bearing in the axial direction (a) and/or in the radial direction (r),
stop elements forming relative to at least one damping direction one or more path delimiters which restrict a spring travel of the bearing body in the corresponding damping direction,
wherein the free travel of the elastomer spring is determined by the spacing (s) of stop faces of the corresponding stop elements which form the path delimiter in the corresponding direction, with the position of one of the stop elements being fixed on or in the bearing, whereas the position of another stop element that corresponds with the one stop element is fixed only relative to the elastomer spring and is movable with the spring during spring compression of the bearing body, and wherein at least in one damping direction, the limitation of the spring travel is adaptable during the operation of the bearing to the preload applied in the direction by releasing the position fix of one of the stop elements of the corresponding path delimiter, by changing the spacing (s) of its stop face from that of the corresponding stop element, and by again fixing the position of the corresponding stop element in its new position, whereby the position of the stop element can be changed by an actuator arranged on the bearing or by temporarily loosening a locking means and passively tracking the position of the stop element according to the preload, wherein at least one of the stop elements forming the path delimiter has an elastomer stop face, wherein the bearing is formed as an elastomer bush bearing with axial limit stops and comprises an inner section, the elastomer bearing body arranged concentric to the inner section, and an outer sleeve receiving the aforementioned parts and connected with the parts through vulcanization, and wherein the axial limit stops are arranged at one axial bearing end parallel to the bearing axis (L) and outside the outer sleeve, wherein stop elements are arranged on both sides of a radially outwardly extending fastening element, which is connected on this bearing end with a bearing body protruding from the bearing sleeve, the stop elements extending into a U-shaped stop element, so that each of the stop elements arranged on the fastening element and a corresponding one of the legs of a U-shaped stop element oriented transversely to the bearing axis (L) form a path delimiter, and wherein the axial position of the U-shaped stop element can be changed by temporarily releasing its position fix.

2. The rubber bearing according to claim 1, wherein at least one of the stop elements (2, 2', 3, 3') forming the path delimiter has an elastomer stop face (6, 6').

3. The rubber bearing according to claim 1, wherein the bearing is formed as an elastomer bush bearing with axial limit stops and comprises an inner section the elastomer bearing body arranged concentric to the inner section, and an outer sleeve receiving the aforementioned parts and connected with the parts through vulcanization.

4. The rubber bearing according to claim 1, wherein at least two chambers connected by a flow channel are formed in the bearing body for receiving a damping fluid.

5. The rubber bearing according to claim 1, wherein for forming the axial limit stops, stop elements are arranged at both axial bearing ends concentric with the bearing axis (L), wherein one stop element of each axial limit stop is formed as a metal stop disk, which is connected with the inner section and therefore has a fixed position relative to the bearing, wherein the corresponding other stop element is connected with the elastomer spring forming the bearing body and has a fixed position relative to the spring, and wherein the position fix of the stop element can be temporarily released, so that the spacing (s) of its stop face from the corresponding stop disk can be changed to adapt to the preload.

6. The rubber bearing according to claim 1, wherein the actuator or the locking means are implemented as one or several hydraulic cylinders.

7. The rubber bearing according to claim 6, wherein the locking means is implemented as a hydraulic cylinder having two chambers, with a piston connected with a stop element via a piston rod guided in the chambers, wherein the chambers of the hydraulic cylinder can be connected with each other by opening a flow channel connecting the chambers for releasing the position fix of the stop element connected with the piston, so that the released stop element tracks a changing preload and the position of the stop element is fixed again after reaching its intended position by closing the channel.

8. The rubber bearing according to claim 6, wherein the hydraulic cylinder forms part of a control circuit wherein the preload applied to the bearing and the spacing (s) between the stop faces of the stop elements of a path delimiter is measured with sensors, wherein a processing unit derives therefrom a controlled variable, and wherein a controller adapts the spring travel to the preload by activating the actuator or the locking means.

* * * * *

UNITED STATES PATENT AND TRADEMARK OFFICE
CERTIFICATE OF CORRECTION

| | |
|---|---|
| PATENT NO. | : 7,338,037 B2 |
| APPLICATION NO. | : 11/181382 |
| DATED | : March 4, 2008 |
| INVENTOR(S) | : Siemer et al. |

It is certified that error appears in the above-identified patent and that said Letters Patent is hereby corrected as shown below:

Column 7, Lines 28-33, "The rubber bearing according to claim 1, wherein the bearing is formed as an elastomer bush bearing with axial limit stops and comprises an inner section the elastomer bearing body arranged concentric to the inner section, and an outer sleeve receiving the aforementioned parts and connected with the parts through vulcanization." should read -- The rubber bearing according to claim 2, wherein the bearing is formed as an elastomer bush bearing with axial limit stops and comprises an inner section, the elastomer bearing body arranged concentric to the inner section, and an outer sleeve receiving the aforementioned parts and connected with the parts through vulcanization. --

Signed and Sealed this
Eighth Day of February, 2011

David J. Kappos
*Director of the United States Patent and Trademark Office*